United States Patent [19]
Kopylov et al.

[11] Patent Number: 5,776,222
[45] Date of Patent: Jul. 7, 1998

[54] METHOD OF ELIMINATING LIGHT SCATTERING BUBBLES IN OPTICAL FIBER PREFORMS

[75] Inventors: Nonna Kopylov, Scotch Plains; Ahmet R. Kortan, Warren, both of N.J.

[73] Assignee: Lucent Technologies Inc., Murray Hill, N.J.

[21] Appl. No.: 594,194

[22] Filed: Jan. 31, 1996

[51] Int. Cl.⁶ .................................................. C03B 37/025
[52] U.S. Cl. .................. 65/384; 65/404; 65/388; 65/389; 65/134.2; 65/134.9; 65/325
[58] Field of Search .................. 65/404, 388, 379, 65/384, 134.2, 134.9, 33.9, 136.4, 389, 424, 426, 32.5

[56] References Cited

U.S. PATENT DOCUMENTS

| | | | |
|---|---|---|---|
| H1259 | 12/1993 | Aggarwal | 65/388 |
| 4,828,593 | 5/1989 | Morishita | 65/134.2 |
| 5,045,507 | 9/1991 | Tran | 65/32.5 |
| 5,055,120 | 10/1991 | Tran | 65/388 |
| 5,160,521 | 11/1992 | Tran | 65/404 |
| 5,401,289 | 3/1995 | France | 65/404 |

OTHER PUBLICATIONS

Narken et al, Vacuum Preparation of High Purity Glass, Nov. 1963, IBM Technical Disclosure Bulletin vol. 6, No. 6 pp. 44–45.

Primary Examiner—John Hoffmann

[57] ABSTRACT

A method of fabricating optical preforms that yield optical fibers having minimal scattering centers by substantially eliminating bubbles and crystallites that form during preform fabrication. The method utilizes glasses having low viscosity in their liquid state to eliminate large bubbles that contain ambient gasses. Small bubbles that have sizes comparable to the wavelength of light are eliminated by simultaneously vacuum-pumping and slow-cooling the liquid glass used to fabricate the preform before pouring the glass into the preform cast mold. Finally, bubbles due to the formation of vacuums in the preform are eliminated by applying a temperature gradient across the cast mold to induce a steep vertical gradient in viscosity in the liquid glass when the liquid glass is poured in the mold.

18 Claims, 1 Drawing Sheet

METHOD OF ELIMINATING LIGHT SCATTERING BUBBLES IN OPTICAL FIBER PREFORMS

FIELD OF THE INVENTION

The present invention relates to fiber optics, and more particularly to a method of eliminating bubble formations in optical preforms to produce low loss optical fibers.

BACKGROUND OF THE INVENTION

Heretofore, many different types of glasses have been used to form optical fibers. These fibers are constructed to utilize a phenomenon called total internal reflection to pipe or transmit information in the form of light from one point to another.

Basically, optical fibers utilize glass materials to confine light as it travels through the fiber. More specifically, when information in the form of light travels through the fiber, the glass does not allow the light to escape or pass out of the fiber. Rather, the glass reflects any light trying to escape back inside so that no power or information is lost during a fiber optic transmission. As a result, optical fibers that maintain total internal reflection for the entire length of the fiber are very desirable for optical communications.

Losses due to light deflecting out of the fiber as it travels through the fiber is referred to as extrinsic scattering loss. The primary cause of this scattering loss is the bubbles and crystals that are formed in the fiber material when the fiber is manufactured. It has been found that some present day fiber manufacturers introduce these bubbles and crystals into the fiber during the high temperature processing of the preform used to compose the fiber.

The manufacture of optical fibers is a precise and highly demanding process requiring special equipment. Generally, the first step in making glass fibers is to make a rod or "preform" of highly purified glass, with a core and a cladding structure. The preform is then heated and drawn out into a thin fiber, which is coated with a protective plastic layer as it is drawn. Thus, if the preform has imperfections (i.e. bubbles or crystallites) formed therein, so too will the optical fiber formed therefrom.

Preparation of a preform having a desired set of properties (i.e. no bubbles or crystallites) often becomes very difficult and sometimes impossible. In fact, traditional preform fabrication techniques yield preforms having many scattering centers (i.e. bubbles), and thus many centers that will increase loss.

SUMMARY OF THE INVENTION

Accordingly, the present invention is directed to a method of eliminating bubble formations in optical preforms thereby producing a preform substantially free of bubbles. To attain this, the present invention utilizes glasses that have a low viscosity in their liquid state (i.e. heavy-metal fluoride glasses).

In one embodiment of the present inventive method, a molten fluoride glass is simultaneously vacuum-pumped and slow-cooled from a liquidus temperature to the casting temperature, and then poured into a cylindrical casting mold where it is cooled such that a temperature gradient forms across the axial length of the cooling glass (colder on the bottom of the mold than the top) and such that the cooling glass solidifies from its outside perimeter to its cylindrical axis with no crystallization or bubble formation. The result is the formation of a preform having substantially less bubbles and crystallites than that associated with the preforms of the prior art. Thus, the present invention overcomes, to a large extent, the limitations associated with the prior art.

These and other features of the invention are described in more complete detail in the following detailed description of the invention when taken with the drawings. The scope of the invention, however, is limited only by the claims appended hereto.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION OF THE INVENTION

Figure 1:
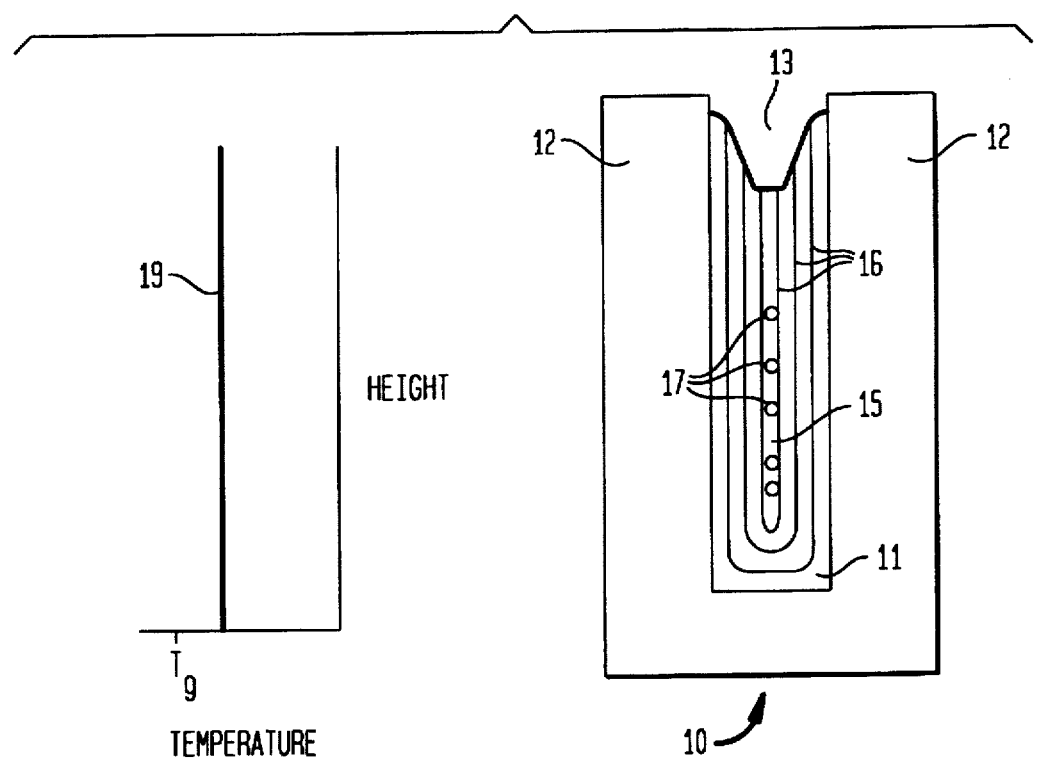
FIG. 1 shows a cross sectional view of bubble formations held in solidifying glass according to the prior art.

A mold 10 for fabricating preforms according to a prior art method is shown in FIG. 1. As shown, preform mold 10 has walls 12 that form a cylindrical cavity 13 in which molten glass 11 is poured to form the preform. According to the method of the prior art, molten glass 11, at a temperature above the liquidus temperature, is poured into preform mold 10. To solidify molten glass 11, preform mold 10 is uniformly held at a temperature slightly under the glass transition temperature Tg of molten glass 11.

In holding the temperature of mold 10 slightly below the glass transition temperature, the solidification process relieves any strain buildup that occurs in glass 11 as it solidifies. Moreover, by holding the temperature of the mold uniform 19, molten glass 11 experiences a rapid quench and solidifies in a glassy state, with no crystallization.

Once molten glass 11 is poured into cavity 13, however, the molten glass 11 first starts solidifying from the outside perimeter, which is in contact with walls 12 of mold 10. This solidification continues toward the center of cylindrical cavity 13 as heat is extracted from the molten glass. The center part 15 of glass 11 remains liquid for an extended period of time which depends on the radius of cavity 13, and the heat capacity and thermal conductivity of glass 11. Moreover, due to the uniform temperature 19 of mold 10, isothermal surfaces or solidification fronts 16 form as glass 11 solidifies. As shown, fronts 16 form parallel to walls 12 of mold 10.

The inventors herein have found three different types of bubbles 17 that form in preforms fabricated according to the method shown in FIG. 1 and described above. The first kind are large bubbles that contain ambient gasses. These bubbles are introduced in the preform during the casting process. More specifically, as the molten glass is poured into the mold, gas is trapped in the liquid.

The second kind of bubbles formed are small bubbles that have sizes comparable to the wavelength of light. These are caused by the precipitation of the gasses dissolved in the liquid glass. The third kind of bubbles formed are vacuum bubbles. These bubbles have sizes varying from microns to millimeters. The formation of vacuum bubbles is due to the volume contraction that takes place during cooling of the liquid glass. Glasses with a large thermal expansion coefficient (e.g. heavy metal fluoride glasses) are particularly susceptible to the formation of the vacuum bubbles.

Figure 2:
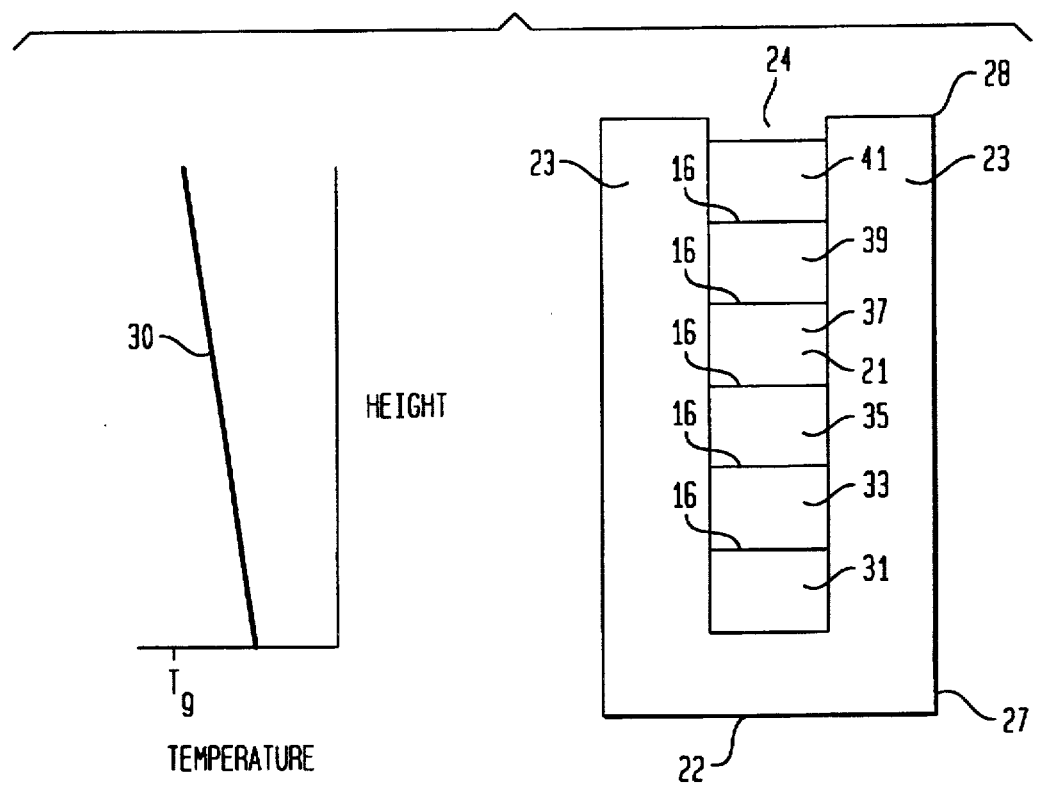
FIG. 2 shows a cross sectional view of bubble-free solidifying glass formed according to the method of the present invention.

To substantially eliminate the formation of all three types of bubbles described above, the present inventors have developed a method for fabricating cast molded preforms, as illustrated in FIG. 2. According to the present inventive method, a glass having a substantially low viscosity is used to fabricate the preform, wherein a low viscosity glass is defined as any glass having a viscosity that changes by a factor of 10 for every 10 degree Celsius change in temperature between the glass softening temperature and the glass crystallization temperature. The low viscosity glass substantially reduces the formation of any of the large bubbles containing ambient gasses, as described above.

The low viscosity glass is heated to a temperature substantially above its transition temperature. The molten glass is then simultaneously vacuum-pumped and slow-cooled to a temperature slightly above the transition temperature of that glass. This vacuum/cooling procedure substantially eliminates any small bubbles having a size comparable to the wavelength of light from forming in the glass preform.

Referring now to FIG. 2, the slow-cooled liquid glass 21 is poured into casting mold 22 having walls 23 that form cylindrical cavity 24. Mold 22 is temperature controlled such that a temperature gradient 30 forms across the liquid glass 21 in cavity 24. Namely, instead of keeping mold 22 at a uniform temperature, as shown in FIG. 1 above, the top 28 of the mold is held at a temperature higher than the bottom 27 during the pouring of liquid glass 21 into cavity 24.

This temperature gradient causes liquid glass 21 to solidify from the bottom 27 to the top 28 of cavity 24 over a predetermined period of time. Thus, area 31 of molten glass 21 solidifies before area 33 which solidifies before area 35 which solidifies before area 39, and area 41 of molten glass 21 is the last section to solidify over said predetermined period of time. This bottom to top cooling introduces a steep vertical gradient in viscosity in the center part of glass 21. This temperature/viscosity gradient helps eliminate both the vacuum bubbles due to volume contractions during cooling, as described above, and the large bubbles that contain ambient gasses. More specifically, the volume contractions that occur during the cooling process are substantially eliminated by the more fluid liquid glass (less viscous glass) that can move down from the upper parts of the cavity 24 during the pouring and cooling process.

In one embodiment of the invention, ZBLAN glass (a mixture of Zirconium, Barium, Lanthanum, Aluminum, Sodium and Fluorine) having a substantially low viscosity is heated to a temperature of about 700° C. The liquid glass is then slow-cooled to approximately 600° C. in 30 minutes under vacuum of $10^{-3}$ Torr in a quartz furnace. When cooled to 600° C., the quartz furnace is then backfilled with dry argon gas. Then the liquid glass is removed from the furnace and poured into the preform mold, as described above. The resultant preform glass has substantially eliminated bubble formations, and thus substantially less scattering centers associated with the prior art.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. A method of making an optical fiber preform, comprising the steps of:
   a. simultaneously vacuum-pumping and cooling a molten liquid glass, said liquid glass having a given viscosity;
   b. pouring said liquid glass into a generally cylindrical casting mold having a bottom and a top end;
   c. applying a temperature gradient across an axial length of said casting mold so that said liquid glass solidifies substantially from said bottom end to said top end over a predetermined period of time thereby producing a preform substantially free of ambient gas bubbles.

2. The method of claim 1 wherein said molten liquid glass is a heavy metal fluoride glass.

3. The method of claim 1 wherein said molten liquid glass is a ZBLAN glass.

4. The method of claim 1 wherein said vacuum pumping comprises vacuum pumping said molten liquid glass at $10^{-3}$ Torr.

5. The method of claim 1 wherein said cooling comprises cooling said molten glass from 700° C. to 600° C.

6. The method of claim 1 wherein said cooling comprises cooling said molten glass from 700° C. to 600° C. in thirty minutes and said vacuum pumping comprises vacuum pumping said molten liquid glass at $10^{-3}$ Torr.

7. The method of claim 1 wherein said temperature gradient applies a higher temperature to a top end of said liquid glass in said casting mold than a bottom end of said liquid glass.

8. The method of claim 7 wherein said temperature gradient induces a viscosity gradient across said liquid glass in said mold.

9. The method of claim 1, wherein said liquid glass having a given viscosity is a glass having a viscosity that changes by a factor of 10 for every 10 degree Celsius change in temperature between a glass softening temperature and a glass crystallization temperature.

10. A method of making an optical fiber preform, comprising the steps of:
   a. heating a glass having a given viscosity to a temperature above a liquidus temperature thereof;
   b. simultaneously vacuum pumping and cooling said liquid glass in a furnace to a temperature substantially near a glass transition temperature thereof;
   c. backfilling said furnace with argon gas;
   d. removing said liquid glass from said furnace;
   e. pouring said liquid glass into a casting mold having a generally cylindrical shape with a bottom and a top end, said casting mold having a temperature slightly below said transition temperature of said glass;
   f. applying a temperature gradient across an axial length of said casting mold so that said liquid glass solidifies from said bottom end to said top end over a predetermined period of time thereby producing a preform substantially free of bubbles.

11. The method of claim 10 wherein said molten liquid glass is a heavy metal fluoride glass.

12. The method of claim 10 wherein said molten liquid glass is a ZBLAN glass.

13. The method of claim 10 wherein said vacuum pumping comprises vacuum pumping said molten liquid glass at $10^{-3}$ Torr.

14. The method of claim 10 wherein said cooling comprises cooling said molten glass from 700° C. to 600° C.

15. The method of claim 10 wherein said cooling comprises cooling said molten glass from 700° C. to 600° C. in thirty minutes and said vacuum pumping comprises vacuum pumping said molten liquid glass at $10^{-3}$ Torr.

16. The method of claim 10 wherein said temperature gradient applies a higher temperature to a top end of said liquid glass in said casting mold than a bottom end of said liquid glass.

17. The method of claim 16 wherein said temperature gradient induces a viscosity gradient across said liquid glass in said mold.

18. The method of claim 10, wherein said liquid glass having a given viscosity is a glass having a viscosity that changes by a factor of 10 for every 10 degree Celsius change in temperature between a glass softening temperature and a glass crystallization temperature.

* * * * *